US012695547B2

(12) United States Patent (10) Patent No.: US 12,695,547 B2
Xu et al. (45) Date of Patent: Jul. 28, 2026

(54) INDICATION INFORMATION RECEIVING METHOD, AND APPARATUS

(71) Applicant: HUAWEI TECHNOLOGIES CO., LTD., Shenzhen (CN)

(72) Inventors: Bin Xu, Beijing (CN); Chenwan Li, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 420 days.

(21) Appl. No.: 18/166,530

(22) Filed: Feb. 9, 2023

(65) Prior Publication Data

US 2023/0188267 A1 Jun. 15, 2023

Related U.S. Application Data

(63) Continuation of application No. PCT/CN2021/110413, filed on Aug. 4, 2021.

(30) Foreign Application Priority Data

Aug. 10, 2020 (CN) .......................... 202010797559.7

(51) Int. Cl.
*H04L 1/1812* (2023.01)
(52) U.S. Cl.
CPC .................................. *H04L 1/1812* (2013.01)
(58) Field of Classification Search
CPC ... H04L 1/1812; H04L 1/1664; H04L 1/1845; H04L 1/1835; H04L 1/1864;
(Continued)

(56) References Cited

U.S. PATENT DOCUMENTS

2012/0002537 A1* 1/2012 Bao ........................ H04W 24/04
370/221
2012/0250498 A1* 10/2012 Johansson ........... H04L 41/0604
370/221
(Continued)

FOREIGN PATENT DOCUMENTS

CN 103828411 B 6/2018
CN 108270516 A * 7/2018 ............... H04L 1/08
(Continued)

OTHER PUBLICATIONS

3GPP TS 38.321 V16.0.0 (Mar. 2020), 3rd Generation Partnership Project; Technical Specification Group Radio Access Network; NR; Medium Access Control (MAC) protocol specification (Release 16), 141 pages.
(Continued)

*Primary Examiner* — Edan Orgad
*Assistant Examiner* — Samuel Roberge Bettendorf

(57) ABSTRACT

In an indication information receiving method, a first terminal device receives first indication information from a first network device, and sends information about at least one HARQ process of the first terminal device to the first network device based on the first indication information, where the information about the at least one HARQ process includes a process number of a first HARQ process. The first terminal device receives first data from the first network device through the first HARQ process. This can improve reliability during data transmission.

20 Claims, 6 Drawing Sheets

(58) Field of Classification Search
CPC ... H04L 1/1883; H04L 1/1896; H04L 1/1822;
H04L 1/1607
See application file for complete search history.

(56)  References Cited

U.S. PATENT DOCUMENTS

| | | | | |
|---|---|---|---|---|
| 2015/0195850 | A1 | 7/2015 | Quan et al. | |
| 2015/0296394 | A1* | 10/2015 | Svedman | H04W 52/48 |
| | | | | 370/223 |
| 2016/0261383 | A1* | 9/2016 | Bergström | H04L 1/1671 |
| 2016/0338066 | A1* | 11/2016 | Yang | H04W 72/21 |
| 2017/0026334 | A1* | 1/2017 | Youn | H04L 61/5007 |
| 2019/0327639 | A1* | 10/2019 | Huang | H04L 1/00 |
| 2021/0258104 | A1* | 8/2021 | Ye | H04W 72/23 |
| 2022/0166560 | A1* | 5/2022 | Laselva | H04L 1/1864 |
| 2023/0125953 | A1* | 4/2023 | Hurd | H04L 5/0078 |
| | | | | 370/329 |
| 2024/0243852 | A1* | 7/2024 | Thomas | H04L 1/1822 |

FOREIGN PATENT DOCUMENTS

| | | | |
|---|---|---|---|
| CN | 108988995 | A | 12/2018 |
| CN | 109391422 | A | 2/2019 |
| CN | 110351020 | A | 10/2019 |
| CN | 111211877 | A | 5/2020 |
| CN | 111315018 | A | 6/2020 |
| CN | 111133817 | B | 6/2022 |
| WO | 2020042028 | A1 | 3/2020 |

OTHER PUBLICATIONS

International Search Report and Written Opinion issued in PCT/CN2021/110413, dated Oct. 22, 2021, 9 pages.
Extended European Search Report dated Nov. 15, 2023, issued in European Application No. 21855415.2 (7 pages).

* cited by examiner

INDICATION INFORMATION RECEIVING METHOD, AND APPARATUS

CROSS-REFERENCE TO RELATED APPLICATION

This application is a continuation of International Application No. PCT/CN2021/110413, filed on Aug. 4, 2021, which claims priority to Chinese Patent Application No. 202010797559.7, filed on Aug. 10, 2020. The disclosures of the aforementioned applications are hereby incorporated by reference in their entireties.

TECHNICAL FIELD

This disclosure relates to the field of communication technologies, and in particular, to an indication information receiving method and an apparatus.

BACKGROUND

In industrial scenarios, service transmission requires high reliability, and accordingly requires high reliability for devices. Currently, a network A/B solution is used in industrial scenarios. The main idea of the network A/B solution is to deploy two sets of access network devices, which are referred to as devices on network A/B. When a device on network A is faulty, a device on network B takes the place of the device on network A to continue service transmission. However, two sets of communication frequencies need to be deployed on the network A/B, causing a waste of scarce frequency resources. In addition, service switching between the two sets of devices is time-consuming. After the device on network B takes the place of the device on network A, because a secondary base station cannot learn of a previous scheduling status of a primary base station, errors occur in HARQ combination during data reception. This reduces reliability during data transmission.

SUMMARY

Embodiments of this disclosure provide an indication information receiving method and an apparatus, to improve reliability during data transmission.

According to a first aspect, a first indication information receiving method is provided. The method includes: A first terminal device receives first indication information from a first network device, and sends information about at least one HARQ process of the first terminal device to the first network device based on the first indication information, where the information about the at least one HARQ process includes a process number of a first HARQ process. The first terminal device receives first data from the first network device through the first HARQ process.

The method may be performed by the first terminal device. The first terminal device may be a communication device or a communication apparatus that can support the communication device in implementing functions required by the method, for example, a chip. For example, the first terminal apparatus is user equipment, a chip disposed in the user equipment for implementing functions of the user equipment, or another component for implementing functions of the user equipment.

In this embodiment of this disclosure, the first terminal device receives the first indication information from the first network device, where the first indication information indicates the first terminal device to send related information of HARQ processes to the first network device, so that the first network device can learn of data receiving and sending processes and statuses of the first terminal device, and learn which HARQ processes of the first terminal device are occupied. This avoids a case in which a data combination error occurs when the first network device performs data scheduling without knowing usage of a HARQ process of the first terminal device. The first terminal device sends HARQ information to the first network device, thereby improving reliability of data transmission between the first network device and the first terminal device.

In an optional implementation, the at least one HARQ process is an occupied HARQ process of the first terminal device, an unoccupied HARQ process of the first terminal device, or all HARQ processes of the first terminal device.

When the at least one HARQ process is an occupied HARQ process of the first terminal device, the first network device indicates, based on the first indication information, the first terminal device to feed back related information of the occupied HARQ process to the first network device, so that the first network device learns of usage of a HARQ of the first terminal device, and preferentially uses an unoccupied HARQ process during data scheduling, or performs data scheduling based on other information and usage of a HARQ process. Optionally, the at least one HARQ process may alternatively be an unoccupied HARQ process or all HARQ processes of the first terminal device. To be specific, the HARQ information fed back by the terminal apparatus to the first network device may alternatively be process information of those unoccupied HARQ processes, or related information of all the HARQ processes.

In an optional implementation, the information about the at least one HARQ process further includes an NDI corresponding to the first HARQ process.

The information about the HARQ process fed back by the first terminal device to the first network device may further include NDIs corresponding to some HARQ processes, that is, new data indicators corresponding to the HARQ processes. In this way, the first network device may perform data scheduling comprehensively based on occupation information of the HARQ process. For example, the first network device may alternatively schedule, by setting different NDI values, an occupied HARQ process to the first terminal device for data transmission. The first terminal device identifies different NDI values in two data transmissions, and learns that data scheduled at this time is newly transmitted data, to avoid confusion and erroneous combination of different data packets. Therefore, by feeding back the NDI value corresponding to the HARQ process, utilization of the HARQ process can be improved while reliability of data transmission is ensured.

In an optional implementation, before the first terminal device receives the first indication information from the first network device, a second network device that communicates with the first terminal device is faulty.

For example, the first terminal device communicates with the second network device, and the second network device performs data scheduling through several HARQ processes of the first terminal device. The second network device is faulty at a moment. After the fault occurs, the first terminal device communicates with the first network device. The first network device indicates, based on the first indication information, the first terminal device to feed back the information related to the HARQ process to the first network device, and then the first network device performs data scheduling for the first terminal device based on the information fed back by the first terminal device. This improves reliability of system data transmission when a network device is faulty.

According to a second aspect, an indication information sending method is provided. The method includes: A first network device sends first indication information to a first terminal device, where the first indication information indicates the first terminal device to send information about at least one HARQ process of the first terminal device to the first network device. The first network device receives the information about the at least one HARQ process from the first terminal apparatus, where the information about the at least one HARQ process includes a process number of a first HARQ process. The first network device sends first data to the first terminal device through the first HARQ process.

The method may be performed by the first network device. The first network device may be a communication device or a communication apparatus that can support the communication device in implementing functions required by the method, for example, a chip. For example, the second network device is a network apparatus, a chip disposed in a network device for implementing functions of the network device, or another component for implementing functions of the network device.

In an optional implementation, the at least one HARQ process is an occupied HARQ process of the first terminal device, an unoccupied HARQ process of the first terminal device, or all HARQ processes of the first terminal device.

In an optional implementation, the information about the at least one HARQ process further includes an NDI corresponding to the first HARQ process.

In an optional implementation, before the first network device sends the first indication information, a second network device is faulty, where the second network device is a network device that communicates with the first terminal device before the fault occurs.

To be specific, before the second network device is faulty, the second network device communicates with the first terminal device. After the second network device is faulty, the first network device communicates with the first terminal device instead. It may be considered that the second network device is a primary station, and the first network device is a secondary station. When the primary station is faulty, the secondary station takes the place of the primary station to communicate with the first terminal device. It may alternatively be understood that the first network device and the second network device work in primary/secondary mode, that is, regardless of which one of the first network device and the second network device is faulty, one of the network devices may take the place of the other to communicate with the first terminal device, and send the first indication information to the first terminal device, to obtain usage of the HARQ process of the first terminal device before the other device is faulty, to facilitate scheduling for data sending and receiving of the first terminal device after the takeover. When a network device connected to the first terminal device is faulty, the other network device indicates the first terminal device to feed back information related to the HARQ process, to ensure service continuity and improve reliability of data transmission.

For technical effects brought by the second aspect or the possible implementations, refer to the descriptions of the technical effects brought by the first aspect or the corresponding implementations.

According to a third aspect, a second indication information receiving method is provided. The method includes: A first terminal device receives second indication information from a first network device. The first terminal device clears a buffer of at least one HARQ process of the first terminal device based on the second indication information.

The method may be performed by the first terminal device. The first terminal device may be a communication device or a communication apparatus that can support the communication device in implementing functions required by the method, for example, a chip. For example, the first terminal apparatus is user equipment, a chip disposed in the user equipment for implementing functions of the user equipment, or another component for implementing functions of the user equipment.

In this embodiment of this disclosure, the first terminal device receives the second indication information from the first network device, where the second indication information indicates the first terminal device to clear the buffer of the at least one HARQ process. When subsequently scheduling newly transmitted data, the first network device may use the HARQ process with the buffer cleared. When receiving data, the first terminal device may accordingly determine that the data is newly transmitted data because the buffer of the HARQ process is empty. This avoids erroneous combination of data caused by transmitting new data by the first network device through an occupied HARQ process, improving reliability of data transmission.

In an optional implementation, the at least one HARQ process is an occupied HARQ process of the first terminal device, a HARQ process specified by the second indication information, or all HARQ processes of the first terminal device.

In an optional implementation, before the first terminal device receives the second indication information from the first network device, a second network device that communicates with the first terminal device is faulty.

According to a fourth aspect, a second indication information sending method is provided. The method includes: A first network device sends second indication information to a first terminal device, where the second indication information indicates the first terminal device to clear a buffer of at least one HARQ process of the first terminal device.

The method may be performed by the first network device. The first network device may be a communication device or a communication apparatus that can support the communication device in implementing functions required by the method, for example, a chip. For example, a second network device is a network apparatus, a chip disposed in the network device for implementing functions of the network device, or another component for implementing functions of the network device.

In an optional implementation, the at least one HARQ process is an occupied HARQ process of the first terminal device, a HARQ process specified by the second indication information, or all HARQ processes of the first terminal device.

In an optional implementation, before the first terminal device receives the second indication information from the first network device, the second network device is faulty, where the second network device is a network device that communicates with the first terminal device before the fault occurs.

For technical effects brought by the fourth aspect or the possible implementations, refer to the description of the technical effects brought by the third aspect or the corresponding implementations.

According to a fifth aspect, a communication apparatus is provided. For example, the communication apparatus is the first terminal device described above. The first terminal device is configured to perform the method in any one of the first aspect or the possible implementations. Specifically, the first communication apparatus may include modules configured to perform the method according to any one of the first aspect or the possible implementations. For example, the apparatus includes a processing module, and optionally may further include a transceiver module. For example, the transceiver module may include a sending module and a receiving module. The sending module and the receiving module may be different functional modules, or may be a same functional module implementing different functions. For example, the first terminal device is a communication device, or is a chip or another component disposed in the communication device. For example, the communication device is a terminal device. For example, the transceiver module may alternatively be implemented by using a transceiver, and the processing module may alternatively be implemented by using a processor (or a processing circuit). Alternatively, the sending module may be implemented by using a transmitter, and the receiving module may be implemented by using a receiver. The transmitter and the receiver may be different functional modules, or may be a same functional module implementing different functions. If the first terminal device is the communication device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. In a description process of the fifth aspect, the processing module and the transceiver module are used as an example for description.

The transceiver module is configured to receive first indication information from a first network device. The processing module is configured to send information about at least one HARQ process of the first terminal device to the first network device based on the first indication information, where the information about the at least one HARQ process includes a process number of a first HARQ process. The transceiver module is further configured to receive first data from the first network device through the first HARQ process.

In an optional implementation, the at least one HARQ process is an occupied HARQ process of the first terminal device, an unoccupied HARQ process of the first terminal device, or all HARQ processes of the first terminal device.

In an optional implementation, the information about the at least one HARQ process further includes an NDI corresponding to the first HARQ process.

In an optional implementation, before the first terminal device receives the first indication information from the first network device, a second network device that communicates with the first terminal device is faulty.

For technical effects brought by the fifth aspect or the optional implementations, refer to descriptions of the technical effects brought by the first aspect or the corresponding implementations.

According to a sixth aspect, a communication apparatus is provided. For example, the communication apparatus is the first network device described above. The first network device is configured to perform the method in any one of the second aspect or the possible implementations. Specifically, the first network device may include modules configured to perform the method according to any one of the second aspect or the possible implementations. For example, the first network device includes a processing module, and optionally may further include a transceiver module. For example, the transceiver module may include a sending module and a receiving module. The sending module and the receiving module may be different functional modules, or may be a same functional module implementing different functions. For example, the first network device is a communication device, or is a chip or another component disposed in the communication device. For example, the first network device is a base station. For example, the transceiver module may alternatively be implemented by using a transceiver, and the processing module may alternatively be implemented by using a processor (or a processing circuit). Alternatively, the sending module may be implemented by using a transmitter, and the receiving module may be implemented by using a receiver. The transmitter and the receiver may be different functional modules, or may be a same functional module implementing different functions. If the first network device is the communication device, the transceiver is implemented, for example, by using an antenna, a feeder, and a codec in the communication device. Alternatively, if the first network device is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. In a description process of the sixth aspect, the processing module and the transceiver module are used as an example for description.

The transceiver module is configured to send first indication information to a first terminal device, where the first indication information indicates the first terminal device to send information about at least one HARQ process of the first terminal device to the first network device. The transceiver module is further configured to receive the information about the at least one HARQ process of the first terminal apparatus, where the information about the at least one HARQ process includes a process number of a first HARQ process. The transceiver module is further configured to send first data to the first terminal device through the first HARQ process.

In an optional implementation, the at least one HARQ process is an occupied HARQ process of the first terminal device, an unoccupied HARQ process of the first terminal device, or all HARQ processes of the first terminal device.

In an optional implementation, the information about the at least one HARQ process further includes an NDI corresponding to the first HARQ process.

In an optional implementation, before the first network device sends the first indication information, a second network device is faulty, where the second network device is a network device that communicates with the first terminal device before the fault occurs.

For technical effects brought by the sixth aspect or the optional implementations, refer to descriptions of the technical effects brought by the second aspect or the corresponding implementations.

According to a seventh aspect, a data receiving method is provided. The method includes: A first terminal device receives first downlink control information from a first network device, where the first downlink control information is for scheduling first data. The first terminal device determines, based on the first downlink control information, that the first data is newly transmitted data. The first terminal device receives the first data from the first network device.

The first network device indicates, based on the first downlink control information, that the data scheduled by the first terminal device this time is newly transmitted data. This avoids a packet loss caused when the first terminal device erroneously combines the first data and other data. For example, the other data may be data stored in a buffer of a same HARQ process as the first data.

In an optional implementation, the first downlink control information includes third indication information indicating that the first data scheduled based on the first downlink control information is newly transmitted data. Alternatively, the first terminal device determines, based on a radio network temporary identifier RNTI using which the first downlink control information is scrambled, that the first data scheduled based on the first downlink control information is newly transmitted data.

In an optional implementation, before the first terminal device receives the first downlink control information from the first network device, a second network device that communicates with the first terminal device is faulty.

According to an eighth aspect, a data sending method is provided. The method includes: A first network device sends first downlink control information to a first terminal device, where the first downlink control information is for scheduling first data, and the first downlink control information further indicates that the first data is newly transmitted data. The first network device sends the first data to the first terminal device.

In an optional implementation, the first downlink control information includes third indication information indicating that the first data is newly transmitted data, or a radio network temporary identifier RNTI using which the first downlink control information is scrambled indicates that the first data is newly transmitted data.

In an optional implementation, before the first network device sends the first downlink control information, a second network device is faulty, where the second network device is a network device that communicates with the first terminal device before the fault occurs.

According to a ninth aspect, a communication apparatus (or referred to as a terminal apparatus) is provided. For example, the communication apparatus is the first terminal device described above. The communication apparatus includes a processor (or a processing circuit) and a communication interface (or an interface circuit). The communication interface may be configured to communicate with another apparatus or device. Optionally, the communication apparatus may further include a memory, configured to store computer instructions. The processor and the memory are coupled to each other, to implement the method according to the first aspect, the third aspect, or the possible implementations. Alternatively, the first terminal device may not include the memory, and the memory may be located outside the first terminal device. The processor, the memory, and the communication interface are coupled to each other, to implement the method according to the first aspect, the third aspect, or the possible implementations. For example, when the processor executes the computer instructions stored in the memory, the first terminal device is enabled to perform the method according to any one of the first aspect, the third aspect, or the possible implementations. For example, the first terminal device is a communication device, or is a chip or another component disposed in the communication device.

If the first terminal device is the communication device, the communication interface is implemented, for example, by using a transceiver (or a transmitter and a receiver) in the communication device, and the transceiver is implemented, for example, by using an antenna, a feeder, and a codec in the communication device. Alternatively, if the first terminal device is the chip disposed in the communication device, the communication interface is, for example, an input/output interface such as an input/output pin in the chip. The communication interface is connected to a radio frequency transceiver component in the communication device, to implement information receiving and sending by using the radio frequency transceiver component.

According to a tenth aspect, a communication apparatus (or referred to as a network apparatus) is provided. For example, the communication apparatus is the first network device described above. The communication apparatus includes a processor (or a processing circuit) and a communication interface (or an interface circuit). The communication interface may be configured to communicate with another apparatus or device. Optionally, the communication apparatus may further include a memory, configured to store computer instructions. The processor and the memory are coupled to each other, to implement the method according to the second aspect, the fourth aspect, or the possible implementations. Alternatively, the first network device may not include the memory, and the memory may be located outside the first network device. The processor, the memory, and the communication interface are coupled to each other, to implement the method according to the second aspect, the fourth aspect, or the possible implementations. For example, when the processor executes the computer instructions stored in the memory, the first network device is enabled to perform the method according to any one of the second aspect, the fourth aspect, or the possible implementations. For example, the first network device is a communication device, or is a chip or another component disposed in the communication device.

If the first network device is the communication device, the communication interface is implemented, for example, by using a transceiver (or a transmitter and a receiver) in the communication device, and the transceiver is implemented, for example, by using an antenna, a feeder, and a codec in the communication device. Alternatively, if the first network device is the chip disposed in the communication device, the communication interface is, for example, an input/output interface such as an input/output pin in the chip. The communication interface is connected to a radio frequency transceiver component in the communication device, to implement information receiving and sending by using the radio frequency transceiver component.

According to an eleventh aspect, a first communication system is provided, including the communication apparatus according to the fifth aspect and the communication apparatus according to the sixth aspect.

According to a twelfth aspect, a computer-readable storage medium is provided. The computer-readable storage medium is configured to store a computer program. When the computer program is run on a computer, the computer is enabled to perform the method according to any one of the first aspect or the possible implementations.

According to a thirteenth aspect, a computer-readable storage medium is provided. The computer-readable storage medium is configured to store a computer program. When the computer program is run on a computer, the computer is enabled to perform the method according to any one of the second aspect or the possible implementations.

According to a fourteenth aspect, a computer-readable storage medium is provided. The computer-readable storage medium is configured to store a computer program. When the computer program is run on a computer, the computer is enabled to perform the method according to any one of the third aspect or the possible implementations.

According to a fifteenth aspect, a computer-readable storage medium is provided. The computer-readable storage medium is configured to store a computer program. When the computer program is run on a computer, the computer is enabled to perform the method according to any one of the fourth aspect or the possible implementations.

According to a sixteenth aspect, a computer program product including instructions is provided. The computer program product is configured to store a computer program. When the computer program is run on a computer, the computer is enabled to perform the method according to any one of the first aspect or the possible implementations.

According to a seventeenth aspect, a computer program product including instructions is provided. The computer program product is configured to store a computer program. When the computer program is run on a computer, the computer is enabled to perform the method according to any one of the second aspect or the possible implementations.

According to an eighteenth aspect, a computer program product including instructions is provided. The computer program product is configured to store a computer program. When the computer program is run on a computer, the computer is enabled to perform the method according to any one of the third aspect or the possible implementations.

According to a nineteenth aspect, a computer program product including instructions is provided. The computer program product is configured to store a computer program. When the computer program is run on a computer, the computer is enabled to perform the method according to any one of the fourth aspect or the possible implementations.

According to a twentieth aspect, a terminal apparatus or a communication apparatus is provided, configured to perform the method in the first aspect.

According to a twenty-first aspect, a network device or a communication apparatus is provided, configured to perform the method in the second aspect.

According to a twenty-second aspect, a terminal device or a communication apparatus is provided, configured to perform the method in the third aspect.

According to a twenty-third aspect, a network device or a communication apparatus is provided, configured to perform the method in the fourth aspect.

According to a twenty-fourth aspect, a chip is provided. The chip includes a processor and a communication interface. The processor is configured to read instructions to perform the method in the first aspect or the method in the third aspect.

According to a twenty-fifth aspect, a chip is provided. The chip includes a processor and a communication interface. The processor is configured to read instructions to perform the method in the second aspect or the method in the fourth aspect.

DESCRIPTION OF EMBODIMENTS

Figures 1, 2:
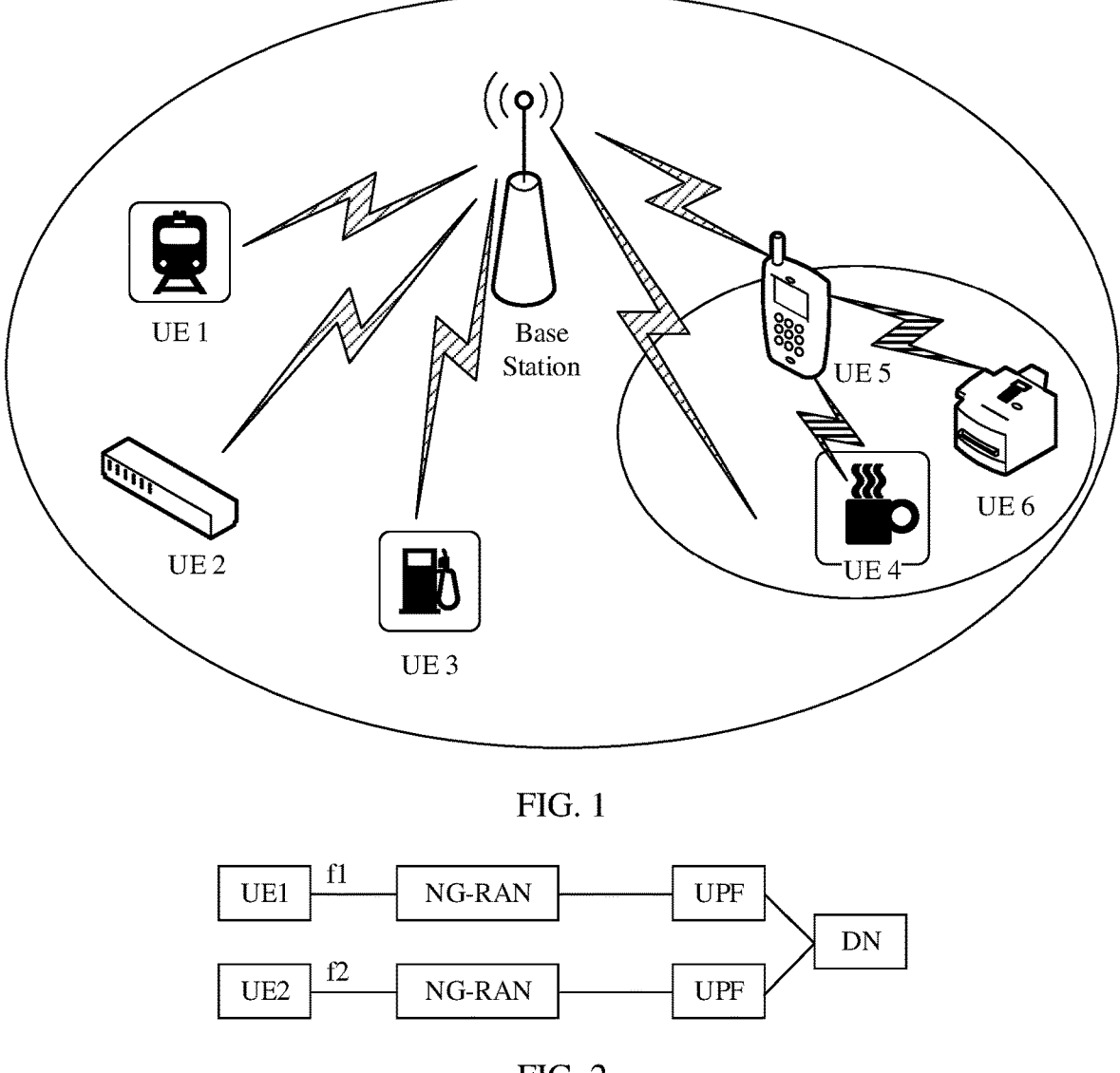
FIG. 1 is a schematic diagram of an application scenario.
FIG. 2 is a schematic diagram of a structure of a network A/B.

To make objectives, technical solutions, and advantages of embodiments of this disclosure clearer, the following further describes embodiments of this disclosure in detail with reference to the accompanying drawings.

The following describes some terms in embodiments of this disclosure, to facilitate understanding of a person skilled in the art.

(1) Terminal device: A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (RAN), and exchange a voice or data with the RAN, or interact a voice and data with the RAN. The terminal device may be user equipment (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may be a mobile phone (or referred to as a "cellular" phone), a computer having a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively be a limited device, for example, a device with relatively low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, and not limitation, in embodiments of this disclosure, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

In embodiments of this disclosure, the terminal device may further include a relay. Alternatively, it is understood that any device that can perform data communication with a base station may be considered as a terminal device.

In embodiments of this disclosure, an apparatus configured to implement a function of the terminal device may be a terminal device, or may be an apparatus, for example, a chip system, that can support the terminal device in implementing the function. The apparatus may be installed in the terminal device. In embodiments of this disclosure, the chip system may include a chip, or may include a chip and another discrete component. In the technical solutions provided in embodiments of this disclosure, the technical solutions provided in embodiments of this disclosure are described by using an example in which the apparatus configured to implement the function of the terminal is the terminal device.

(2) Network device: A network device includes, for example, an access network (AN) device such as a base station (for example, an access point), and may be a device that is in an access network and that communicates with a wireless terminal device over an air interface through one or more cells. Alternatively, the network device is, for example, a road side unit (RSU) in a vehicle-to-everything (V2X) technology. The base station may be configured to perform mutual conversion between a received over-the-air frame and an IP packet, to serve as a router between a terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in an LTE system or a long term evolution-advanced (LTE-A) system, or may be a next generation NodeB (gNB) in a 5G NR system (also referred to as an NR system), or may include a CU and a DU in a cloud radio access network (Cloud RAN) system. This is not limited in embodiments of this disclosure.

The network device may further include a core network device. The core network device includes, for example, a mobility management entity (MME) in a 4G system, or an access and mobility management function (AMF) or a user plane function (UPF) in a 5G system.

In embodiments of this disclosure, an apparatus configured to implement a function of the network device may be a network device, or may be an apparatus, for example, a chip system, that can support the network device in implementing the function. The apparatus may be installed in the network device. In the technical solutions provided in embodiments of this disclosure, the technical solutions provided in embodiments of this disclosure are described by using an example in which the apparatus configured to implement the function of the network device is the network device.

(3) Terms "system" and "network" may be used interchangeably in embodiments of this disclosure. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

In addition, unless otherwise stated, in embodiments of this disclosure, ordinal numbers such as "first" and "second" are intended to distinguish between a plurality of objects, but are not intended to limit sizes, content, orders, time sequences, priorities, importance, or the like of the plurality of objects. For example, first indication information and second indication information are merely intended to distinguish between different indication information, but do not indicate that the two pieces of indication information are different in data amounts, content, priorities, importance, or the like.

The foregoing describes some terms in embodiments of this disclosure. The following describes technical features in embodiments of this disclosure.

HARQ (Hybrid Automatic Repeat request) is a method for ensuring data transmission reliability. After receiving data, a receiving end detects whether a received data packet is erroneous. If no error is detected, the receiving end sends a positive acknowledgment (ACK) to a transmitting end. After receiving the ACK, the transmitting end sends a next data packet. If the received data packet is erroneous, the receiving end places the data packet in a buffer, and sends a negative acknowledgment (NACK) to the transmitting end. After receiving the NACK, the transmitting end resends data the same as the data packet. Although the data packets in the buffer cannot be correctly decoded, the data packets still include useful information. By using HARQ with soft combining (HARQ with soft combining), the erroneously received data packets and subsequent retransmitted data packets are combined to obtain a data packet that is more reliable than a data packet that is individually decoded (this is a "soft combining" process). Then, the combined data packet is decoded. If decoding still fails, a process of "requesting retransmission, and then performing soft combination" is repeated.

Each piece of sent data occupies a HARQ process number when HARQ is performed. Therefore, there may be a plurality of parallel HARQ processes at the same time, each with its own process number. When a HARQ process is waiting for acknowledgement information, the transmitting end may continue to send new data by using another HARQ process. Different HARQ processes work independently of each other. Each HARQ process processes only one TB (Transport Block) in one TTI (transmission time interval). Each HARQ process requires an independent HARQ buffer at the receiving end, to perform soft combination on received data.

There are the following concepts related to HARQ.

HARQ process number: also referred to as a HARQ process ID. The HARQ process number uniquely specifies a HARQ process.

NDI: short for new data indicator. Each HARQ process has an NDI value. 1 bit in the value indicates whether scheduled data is newly transmitted or retransmitted. If an NDI value of a same HARQ process changes (NDI toggled), it indicates that current transmission is initial transmission of a new TB; otherwise (NDI not toggled), it indicates that current transmission is retransmission of a same TB.

RV: short for redundancy version. RV indicates a redundancy version for current transmission, with a value range of 0 to 3.

When a HARQ technology is used for sending a data packet, a specific HARQ process number is allocated to the data packet. Correspondingly, a HARQ buffer is maintained at both the transmitting end and the receiving end for the process number. For the transmitting end, maintaining the HARQ buffer is to reserve backup for retransmission in the case of failure of current transmission for a data packet. For the receiving end, maintaining the HARQ buffer is to store a failed data packet in the buffer after a receiving failure, and soft combined with the failed data packet in the buffer when a same data packet is received next time.

In the current technology, downlink transmission is used as an example. When receiving specific scheduling, a first terminal device determines, based on whether an NDI value in scheduling information sent by a base station is toggled, whether current scheduling of a process is for a newly transmitted packet or a retransmitted packet. If the current scheduling is for a newly transmitted packet, the first terminal device clears a HARQ buffer corresponding to the process, and stores the newly transmitted packet. If the current scheduling is for a retransmitted packet, the retransmitted packet and a data packet in the HARQ buffer are combined and then decoded.

In addition, the technical feature in this disclosure relates to a structure of a network A/B. The following briefly describes the structure of the network A/B with reference to FIG. 2. In industrial scenarios, service transmission requires high reliability, and accordingly requires high reliability for devices. Once a device is faulty, service transmission cannot be ensured. Currently, a network A/B solution is used in industrial. As shown in FIG. 2, the main idea of the network A/B solution is to deploy two sets of access network devices, which are referred to as devices on network A/B. When devices on network A are faulty, devices on network B take the place of the devices on network A to continue service transmission.

Figure 3:
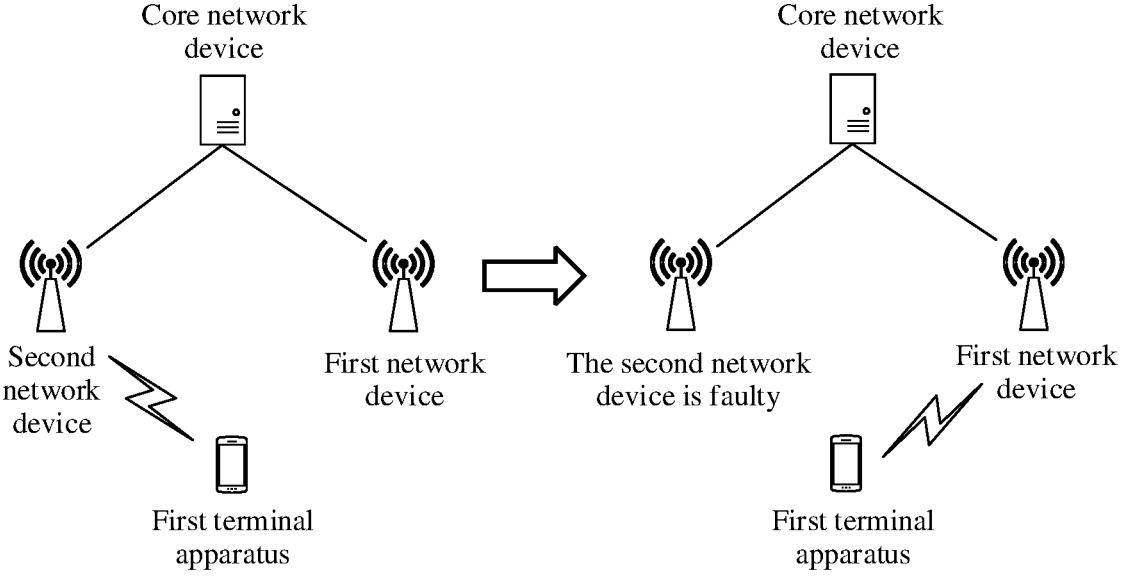
FIG. 3 is a schematic diagram of an application scenario according to an embodiment of this disclosure.

Because two sets of communication frequencies need to be deployed on the network A/B, causing a waste of scarce frequency resources. In addition, service switching between the two sets of devices is time-consuming and a large quantity of data packets are lost. This cannot ensure service continuity. The present invention provides a solution for fast switch between a primary station and a secondary station. As shown in FIG. 3, when a second network device, that is, a primary station works normally, a first network device, that is, a secondary station, does not communicate with a first terminal device. When the secondary station detects that the primary station is faulty, the secondary station immediately is enabled to communicate with the first terminal device. Compared with the structure of the network A/B shown in FIG. 2, a delay of base station switch can be reduced, and service continuity can be improved. In a process in which the primary station and secondary station alternate, for a network device, the first terminal device is unaware of switch between the first network device and the second network device.

Figure 4:
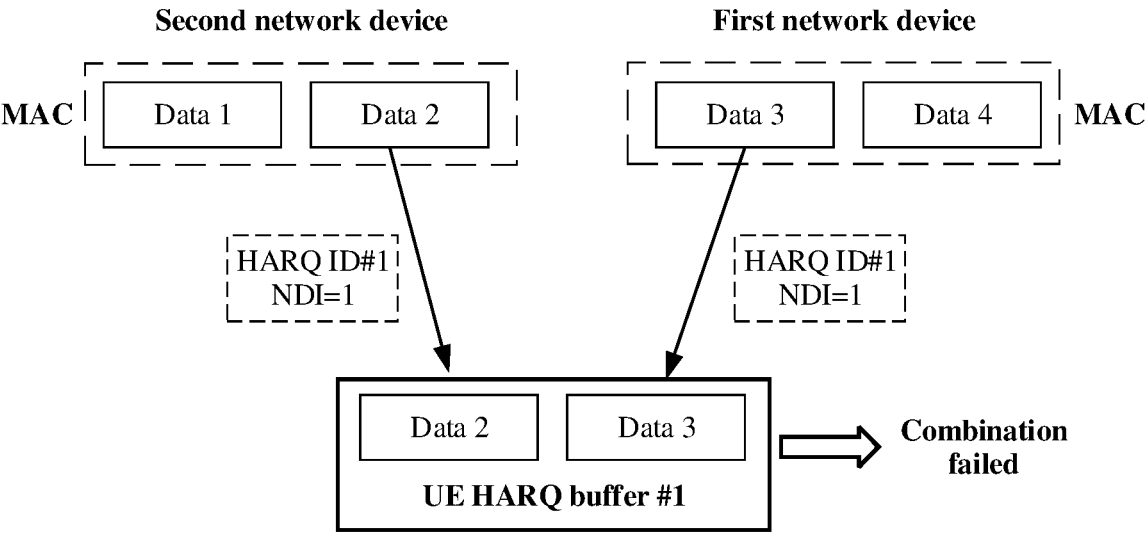
FIG. 4 is a schematic diagram of a data combination process.

In a scenario in which the second network device is faulty, the first network device takes the place of the second network device, and continues to schedule a new data packet. However, because the first network device cannot learn of a previous scheduling status of the second network device, new scheduling performed by the first network device may be inconsistent with previous scheduling performed by the second network device. In this case, if the first terminal device still determines, based on only whether an NDI value is toggled, whether current scheduling is new transmission or retransmission, erroneous combination may occur. With reference to FIG. 4, an example in which the second network device is a primary station and the first network device is a secondary station is used for description below. In an actual network architecture, the first network device is a primary station and the second network device is a secondary station, or the first network device and the second network device work in primary/secondary mode. This is not limited herein.

As shown in FIG. 4, before the primary station (for example, the second network device) is faulty, the primary station sends a data packet 2 to the first terminal device (for example, the first terminal device) by using a HARQ process 1, and an NDI is set to 1 to indicate that current transmission is new transmission. After receiving the data packet, the first terminal device reads the NDI and determines that the transmission is new transmission, and stores the data packet into a buffer corresponding to the HARQ process 1. If the data packet 2 is erroneously received, the data packet 2 waits for retransmission and combination in the buffer corresponding to the HARQ process 1. It is assumed that the primary station is faulty in this case, and the secondary station (for example, the first network device) takes the place of the primary station to communicate with the first terminal device. Because the secondary station does not know that the HARQ process 1 has been used by the primary station for transmission, the secondary station may also use the HARQ process 1 to transmit a data packet 3, and set the NDI to 1. In this case, after receiving this scheduling, the first terminal device considers that the data packet 3 is retransmitted for the data packet 2, and therefore combines and decodes the received data packet 3 and data packet 2 in a HARQ buffer. Obviously, the combination fails because the two data packets are different. Then, the first terminal device feeds back a NACK, and the base station retransmits the packet 3. The first terminal device combines the newly received packet with the previously packet that fails to be combined. As a result, the combination still fails. Although the communication link is normal, the first terminal device cannot successfully receive the packet, resulting in packet loss.

In view of this, the technical solutions in embodiments of this disclosure are provided. In embodiments of this disclosure, a technical solution is provided. When a primary station is faulty, a secondary station exchanges contexts with the primary station, or the secondary station indicates a first terminal device to feed back usage of a HARQ process, or the secondary station indicates the first terminal device to clear a buffer of a related HARQ process, or directly indicates that a specific scheduling is new transmission, to learn of information about the HARQ process of the first terminal device. This avoids erroneous combination in the first terminal device, and improves reliability of data transmission.

The technical solutions provided in embodiments of this disclosure may be applied to a 4th generation (4G) mobile communication technology system, for example, an LTE system, or may be applied to a 5G system, for example, an NR system, or may be applied to a next-generation mobile communication system or another similar communication system, provided that an entity in the communication system has information to be sent, and another entity needs to receive the information. This is not specifically limited. In addition, an air interface communication process between the network device and the terminal device is used as an example for description of embodiments of this disclosure. Actually, the technical solutions provided in embodiments of this disclosure may also be applied to a sidelink (SL) scenario, provided that one terminal device can initiate paging to another terminal device. For example, the technical solutions provided in embodiments of this disclosure may be applied to device-to-device (D2D) scenarios such as an NR D2D scenario or an LTE D2D scenario, or may be applied to vehicle-to-everything (V2X) scenarios such as an NR V2X scenario or an LTE V2X scenario. For example, the technical solutions may be applied to the Internet of vehicles such as V2X, LTE-V, or vehicle-to-vehicle (V2V), or may be applied to fields such as intelligent driving or intelligent connected vehicles.

FIG. 1 shows an application scenario according to an embodiment of this disclosure. As shown in the figure, a base station and a first terminal device 1 to a first terminal device 6 constitute a communication system. In the communication system, the first terminal device 1 to the first terminal device 6 may send uplink data to the base station, and the base station needs to receive the uplink data sent by the first terminal device 1 to the first terminal device 6. In addition, the first terminal device 4 to the first terminal device 6 may also constitute a communication system. In the communication system, the BS may send downlink information to the first terminal device 1, the first terminal device 2, the first terminal device 5, and the like. The first terminal device 5 may also send downlink information to the first terminal device 4 and the first terminal device 6. The first terminal device 4 and the first terminal device 6 may also send uplink information to the base station via the first terminal device 5.

In addition, the present invention is not only applied to a scenario in which one base station communicates with a plurality of first terminal devices, but also applied to a scenario in which a plurality of base stations coordinate to perform data communication with a plurality of first terminal devices. For example, the plurality of base stations work in primary/secondary mode. After a primary base station is faulty, a secondary base station is enabled to communicate with the first terminal device.

The following describes methods provided in embodiments of this disclosure with reference to the accompanying drawings.

Figures 5, 6:
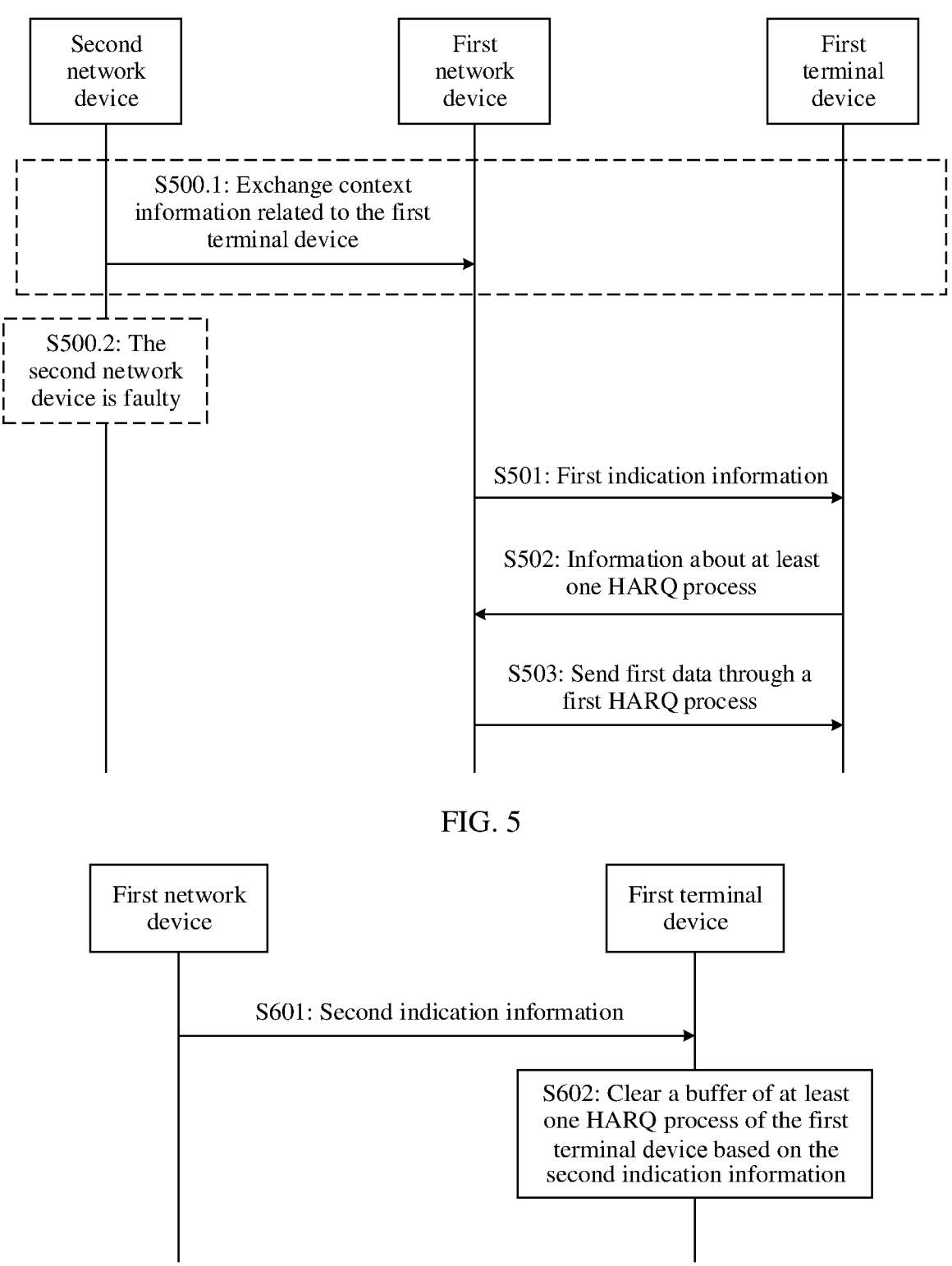
FIG. 5 is a flowchart of an indication information receiving method according to an embodiment of this disclosure.
FIG. 6 is a flowchart of another indication information receiving method according to an embodiment of this disclosure.

An embodiment of this disclosure provides an indication information receiving method. FIG. 5 is a flowchart of the method. In the following description process, for a corresponding application scenario, refer to FIG. 3.

S500.1: A first network device exchanges context information of a first terminal device with a second network device.

The context information exchanged between the first network device and the second network device includes information about a HARQ process of the first terminal device. For example, if the first network device currently communicates with the first terminal device, and the second network device does not communicate with the first terminal device, the first network device sends the context information of the first terminal device to the second network device at a specific period, where the context information may include HARQ information of the first terminal device. In addition, a quantity of secondary stations is not limited to one. For example, when communicating with a terminal apparatus, the first network device may simultaneously exchange context information with the second network device, a third network device, and another network device, where these network devices are peers. In other words, these network devices work in primary/secondary mode. In this way, when the first network device is faulty, any one of the network devices continues to communicate with the first terminal device.

Exchanged information about HARQ processes may be information about all or some HARQ processes of the first terminal device. For details, refer to the following manners.

Manner 1: Optionally, the first network device exchanges the context information of the first terminal device with the second network device, where the exchanged information is information about all the HARQ processes of the first terminal device. For example, when 16 HARQ processes are allocated to one terminal apparatus, the exchanged information is information about all the 16 HARQ processes of the first terminal device. Specifically, the information about the HARQ process may include at least one of the following: a process number of the HARQ process, a HARQ process feedback type (ACK/NACK) corresponding to the HARQ process, an NDI value corresponding to the HARQ process, whether a HARQ buffer corresponding to the HARQ process is occupied, and the like. In this way, the first network device can learn of in real time whether the primary station, that is, the second network device, schedules the HARQ process of the first terminal device, so that the first network device can quickly take the place of the second network device to communicate with the first terminal device when the second network device is faulty, and perform data scheduling for the first terminal device based on the information about the HARQ process of the first terminal device obtained from the exchanged context information. For example, when the exchanged context information includes the information about all the HARQ processes of the first terminal device, the first network device can learn of all data transmission processes in advance. Therefore, the first network device may preferentially select an unoccupied HARQ process for data scheduling, to reduce complexity of data scheduling.

In a possible feedback form, an identifier of the first terminal device is fed back. The identifier corresponds to a plurality of process numbers. The process numbers belong to the first terminal device corresponding to the identifier, and each process number corresponds to one NDI. The foregoing mapping relationship may be fed back by using a tree structure, an information element structure, or a table. In addition, in this embodiment, the HARQ information may be exchanged in a similar manner for a plurality of terminal apparatuses, so that the secondary station can properly communicate with all the terminal apparatuses after take-over.

For unoccupied HARQ processes of the first terminal device, the first network device may directly schedule these HARQ processes to send data to the first terminal device. For an occupied HARQ process of the first terminal device, optionally, the second network device or the first terminal device may send indication information to the first network device, to indicate a data packet corresponding to the occupied process. After the secondary station, that is, the first network device, receives information about the HARQ process, the first terminal device determines whether the secondary station stores the data packet of the HARQ process. If the secondary station stores the data packet, the secondary station (the first network device) sends the data packet to the first terminal device again. If the secondary station does not store the data packet stored in the occupied HARQ process, the secondary station may schedule a new data packet based on an NDI value of the process. For example, the NDI value of the occupied HARQ process is 1. When the first network device uses the HARQ process to schedule other newly transmitted data, the NDI value of the HARQ process is set to 0. After the first terminal device receives the data, although the HARQ buffer is occupied, the first terminal device may still determine, based on a current NDI value different from a previous NDI value, that the data transmitted this time is newly transmitted data, avoiding erroneous combination of the data transmitted this time with other data. In this manner, after the faulty primary station is taken the place by the secondary station, the secondary station may still send the data by using the occupied HARQ process, and the first terminal device can determine that the data is newly transmitted data. This improves resource utilization in a data transmission process and effectively ensures transmission reliability.

Manner 2: Optionally, the first network device exchanges the context information of the first terminal device with the second network device, where the exchanged information is information about an occupied HARQ process of the HARQ processes of the first terminal device. The occupied HARQ process means that data is stored in a buffer corresponding to the HARQ process or that a buffer corresponding to the HARQ process is occupied by data. A total quantity of HARQ processes of the first terminal device is definite. Therefore, after the first terminal device feeds back the occupied HARQ process, the first network device may determine which HARQ processes are unoccupied.

Manner 3: Optionally, the first network device exchanges the context information of the first terminal device with the second network device, where the exchanged information is information about an unoccupied HARQ process of the HARQ processes of the first terminal device. After obtaining the information about the unoccupied HARQ process, the first network device may determine which HARQ processes are occupied.

S500.2: The second network device is faulty.

The second network device communicates with the first terminal device before the second network device is faulty. After the second network device is faulty, the first network apparatus serving as a secondary station of the second network device takes the place of the second network device to communicate with the first terminal device. Optionally, the first network device and the first network device work in primary/secondary mode, and there may be more than one secondary station.

S500.1 and S500.2 are optional, that is, S501, S502, and S503 are not prerequisites for S500.1 and S500.2. In addition, S500.1 and S500.2 may form an independent embodiment. To be specific, the first network device and the second network device exchange the information about the HARQ process of the first terminal device in real time, so that the secondary station serving as the first network device can learn of in real time usage of the HARQ process of the first terminal device for the primary station. When the second network device is faulty, after the first network device takes the place of the second network device, the first network device can quickly and accurately schedule data because the first network device fully understands the usage of the HARQ process. This reduces a delay of switch between the primary station and secondary station, and effectively improves reliability of data scheduling.

S501: The first network device sends first indication information to the first terminal device, and the first terminal device receives the first indication information from the first network device. The first indication information indicates the first terminal device to send information about at least one HARQ process of the first terminal device to the first network device.

After taking the place of the second network device, the first network device sends the first indication information to the first terminal device, where the first indication information indicates the first terminal device to feed back the information about the HARQ process of the first terminal device to the first network device. Specifically, the first terminal device feeds back some or all of HARQ processes of the first terminal device to the first network device as required. For specific feedback manners, refer to Manner 1, Manner 2, and Manner 3 in S500.1, which are respectively specific to feeding back information about all HARQ processes, feeding back information about an occupied HARQ process, and feeding back information about an unoccupied HARQ process.

Specifically, the information about the HARQ process may include at least one of the following: a process number of the HARQ process, a HARQ process feedback type (ACK/NACK) corresponding to the HARQ process, an NDI value corresponding to the HARQ process, whether a HARQ buffer corresponding to the HARQ process is occupied, and the like.

When the feedback manner is Manner 1 or Manner 2, optionally, for an occupied HARQ process, a process number of the HARQ process and an NDI value corresponding to the HARQ process may be fed back. The first network device may determine unoccupied HARQ processes based on the information about the unoccupied HARQ process fed back by the first terminal device or directly based on a total quantity of HARQ processes of the first terminal device. The first network device may directly schedule an unoccupied HARQ process to send data to the first terminal device. For the occupied HARQ process, the first network device may perform NDI negation during scheduling. For example, a HARQ process #2 is an occupied HARQ process, and currently, an NDI corresponding to the HARQ process #2 is 0. When the first network device needs to schedule the HARQ process #2, the NDI may be negated, that is, NDI=1. In this case, when receiving data sent by using the HARQ process #2, the first terminal device determines that the data is newly transmitted data.

S502: The first terminal device sends the information about the at least one HARQ process of the first terminal device to the first network device based on the first indication information, where the information about the at least one HARQ process includes a process number of a first HARQ process.

As described in S501, the at least one HARQ process may be all HARQ processes of the first terminal device, or the occupied HARQ process of the first terminal device, or the unoccupied HARQ process of the first terminal device.

The at least one HARQ process includes the process number of the first HARQ process. Optionally, the first network device selects the first HARQ process from the HARQ processes fed back by the first terminal device for data scheduling. For example, if the first HARQ process is unoccupied, the first network device may directly schedule, without performing other determining, the first HARQ process to send data. If the first HARQ process is occupied, the first network device may perform data scheduling based on an NDI of the first HARQ process, for example, perform NDI negation. If the first network device stores a data packet that fails to be transmitted previously in the process, the first network device may retransmit the data through the first HARQ process. In this case, NDI negation does not need to be performed.

Optionally, a quantity of first HARQ processes is not limited to one. To be specific, the first network device may determine scheduling of new data for the first terminal device based on usage of a plurality of HARQ processes.

Optionally, the first terminal device may feed back the information about the at least one HARQ process to a base station through a physical uplink control channel PUCCH (Physical Uplink Control Channel) or a physical uplink shared channel PUSCH (Physical Uplink Shared Channel), for example, a MAC CE (MAC Control Element).

S503: The first network device sends first data to the first terminal device through the first HARQ process, and the first terminal device receives the first data from the first network device through the first HARQ process.

The first terminal device receives the first data from the first network device through the first HARQ process. When the first HARQ process is unoccupied, the first terminal device may determine that the first data is newly transmitted data.

When the first HARQ process is occupied, the first terminal device further performs determining based on the NDI. If a current NDI of the first HARQ process is different from a previous NDI, the first terminal device determines that the first data is newly transmitted data.

Optionally, if the current NDI of the first HARQ process is the same as the previous NDI, that is, the first network device has buffered a data packet in a buffer of the first HARQ process, the first terminal device determines that current transmission is retransmission, and soft combines the first data with the data in the buffer of the HARQ process.

FIG. 6 is a schematic flowchart according to another embodiment of this disclosure.

Optionally, steps S500.1 and S500.2 may be performed before S601. This is not limited herein.

S601: A first network device sends second indication information to a first terminal device, and the first terminal device receives the second indication information from the first network device. The second indication information indicates the first terminal device to clear a buffer of at least one HARQ process of the first terminal device.

S602: The first terminal device clears the buffer of the at least one HARQ process of the first terminal device based on the second indication information.

The at least one HARQ process is an occupied HARQ process of the first terminal device, a HARQ process specified by the second indication information, or all HARQ processes of the first terminal device.

When the second indication information indicates the first terminal device to clear the specified HARQ process, the second indication information includes a process number of the HARQ process that needs to be cleared. For example, the second indication information indicates the first terminal device to clear buffers of a HARQ process #1, a HARQ process #2, a HARQ process #4, and a HARQ process #7. After the first terminal device clears the buffers, the first network device may directly schedule the HARQ process for transmission of new data. Certainly, the first network device may further schedule another HARQ process for data transmission, for example, an unoccupied HARQ process.

The first network device indicates, based on the second indication information, the first terminal device to clear buffers of all/occupied HARQ processes or HARQ processes indicated by the second indication information. When a primary station is faulty, a secondary station takes the place of the primary station and uses a corresponding HARQ process to send new data to the first terminal device. Because a buffer corresponding to the related process is cleared, when receiving data, the first terminal device may determine that the data is newly transmitted data, avoiding erroneous combination of the data and other data.

Figure 7:
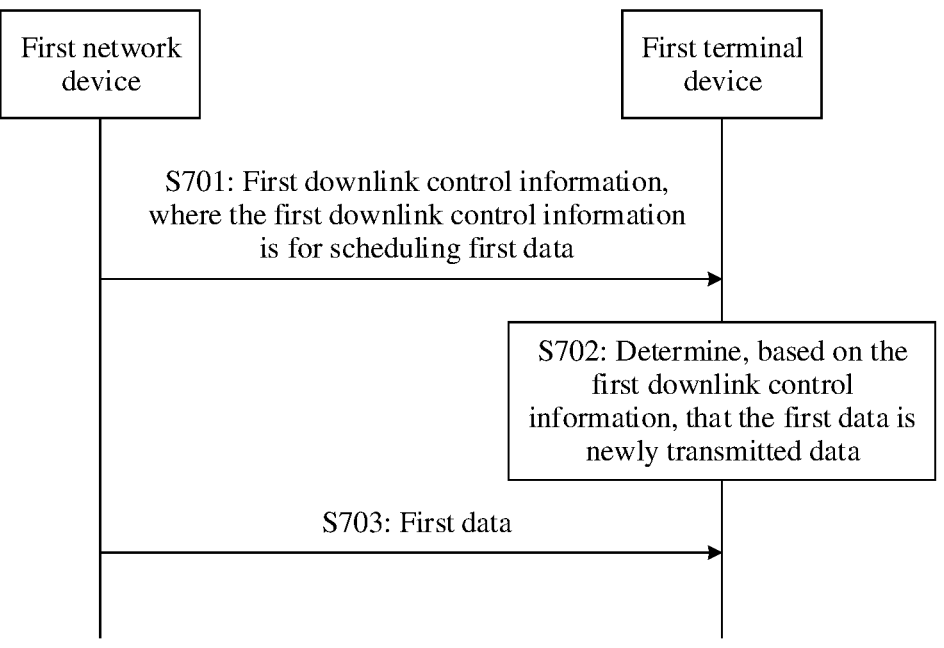
FIG. 7 is a flowchart of still another indication information receiving method according to an embodiment of this disclosure.

FIG. 7 is a schematic flowchart according to still another embodiment of this disclosure.

Optionally, steps S500.1 and S500.2 may be performed before S701. This is not limited herein.

S701: A first network device sends first downlink control information to a first terminal device, and the first terminal device receives the first downlink control information from the first network device, where the first downlink control information is for scheduling first data.

S702: The first terminal device determines, based on the first downlink control information, that the first data is newly transmitted data.

There are a plurality of manners in which the first terminal device determines that the first data is newly transmitted data.

Manner A: The first downlink control information includes third indication information indicating that the first data is newly transmitted data. After receiving the first downlink control information, the first terminal device determines, based on the third indication information in the first downlink control information, that currently scheduled data is newly transmitted data. In this case, the first terminal device skips determining of an NDI in the HARQ process, may directly determine, based on the third indication information, that currently scheduled data is newly transmitted data, and clear a buffer of a corresponding HARQ process. This avoids combination of the newly transmitted data and an original data packet. Optionally, whether the first downlink control information includes the third indication information may be indicated by another indication information. If the first downlink control information does not include the third indication information, whether the data is newly transmitted data or retransmitted data is still determined based on an NDI.

Manner B: The first terminal device determines, based on a radio network temporary identifier RNTI using which the first downlink control information is scrambled, that the first data is newly transmitted data. Optionally, the first terminal device may determine, based on an RNTI using which a physical downlink control channel PDCCH (Physical Downlink Control Channel) is scrambled, that the first data is newly transmitted data. The first network device may select a specific RNTI to indicate that data scheduled by DCI or the PDCCH is newly transmitted data. Specifically, the network device may agree in advance with the terminal device on which RNTIs are used to scramble the DCI/PDCCH for scheduling newly transmitted data, and which RNTIs are not used to specially indicate new transmission of data, or a relationship table between a value of an RNTI and new transmission may be pre-defined in a protocol, pre-stored in the terminal device, or pre-configured by the network device. After receiving the DCI/PDCCH and using a corresponding RNTI for successful descrambling, the terminal device may determine whether the DCI is DCI indicating new transmission of data. If the DCI is not DCI indicating new transmission of data, the terminal device further performs determining based on a case whether the NDI is toggled.

Manner C: A new search space or a new DCI format is used for determining For example, if a PDCCH or DCI is detected in a search space different from a search space in which conventional DCI is located, the transmission is considered as new transmission. If DCI in a format different from the conventional DCI is detected, the transmission is considered as new transmission.

S703: The first network device sends the first data to the first terminal device, and the first terminal device receives the first data from the first network device.

Optionally, a sequence relationship between S702 and S703 is not limited, and S702 and S703 may be performed synchronously.

Optionally, the first network device may help the first terminal device in another manner to determine that data is newly transmitted data.

The network device may set a timer for each HARQ process of the first terminal device or set a same timer for all HARQ processes of the first terminal device. A value of the timer is configured by a base station or specified in a protocol. For example, the value of the timer is set to T1. Values of the timer corresponding to different HARQ processes may be the same or different. A function of the timer is to indicate the first terminal device to clear a HARQ buffer corresponding to a HARQ process after a specific time, to avoid low efficiency caused by long-time occupation of the HARQ process due to a data transmission error. In a case in which a timer is set for each HARQ process, when receiving data scheduled by using the process, the first terminal device starts or restarts a corresponding timer. After the timer expires, the first terminal device clears a corresponding HARQ buffer, indicating that the first terminal device cannot correctly receive the data within a time T1, and therefore gives up receiving the data. In a case in which a same timer is set for all HARQ processes, start and restart of the timer are not subject to scheduling (or the timer may not be used). Starting from a specified moment (where the moment is specified by the network device, or the moment is determined based on a received configured moment), all HARQ buffers of a terminal apparatus are cleared at a fixed interval.

In this way, when a primary station is faulty, and a secondary station takes the place of the primary station and uses a HARQ process to perform scheduling for new transmission, a corresponding timer may have expired, and therefore no erroneous combination occurs. Optionally, after the secondary station takes the place of the primary station, the secondary station may wait for a period of time, for example, T2, to ensure that a to-be-used HARQ buffer has been cleared, and then schedule newly transmitted data.

When the primary station is faulty, and the secondary station takes the place of the primary station, and when the secondary station schedules newly transmitted data to the first terminal device, the secondary station continuously sends a same data packet twice by using a same process number, and sets NDIs in the two times of sending to be different. In this way, because an NDI value used in the 2nd sending is different from an NDI value used in the 1st sending, the 2nd sending is determined as new transmission, and whether combination is successful in the 1st sending does not affect receiving of the data packet in the 2nd sending. For example, after the takeover, the first network device sends a data packet 1 to the first terminal device, where the data packet 1 is newly transmitted data. The first network device may send the data packet 1 to the first terminal device by using a HARQ process #2. In the 1st sending, NDI=0, and in the 2nd sending, NDI=1; or vice versa. The first terminal device receives two pieces of data sent by the same HARQ process #2, and can determine, based on two different NDIs, that the data transmitted in the second time is newly transmitted data. Therefore, the data transmitted in the second time is not erroneously combined with other data.

Indication information sent by the base station in the foregoing step, for example, the first indication information, the second indication information, and the third indication information, may be a MAC CE, DCI, RRC signaling, a PDCP control PDU, or an RLC control PDU. A specific type of the indication information is not limited.

The following describes apparatuses for implementing the foregoing methods in embodiments of this disclosure with reference to the accompanying drawings. Therefore, all the foregoing content may be used in the following embodiments. Repeated content is not described again.

Figure 8:
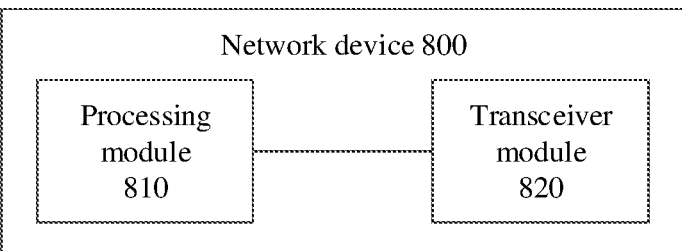
FIG. 8 is a schematic block diagram of a network device according to an embodiment of this disclosure.

FIG. 8 is a schematic block diagram of a communication apparatus 800 according to an embodiment of this disclosure. For example, the communication apparatus 800 is a first network device 800. For example, the first network device 800 is the first network device in any one of the embodiments shown in FIG. 5 to FIG. 7.

The first network device 800 includes a processing module 810 and a transceiver module 820. For example, the first network device 800 may be a base station, a chip used in the base station, or another combined device or a component that has functions of the core network device. When the first network device 800 is the core network device, the transceiver module 820 may be a transceiver. The transceiver may include an antenna, a radio frequency circuit, and the like. The processing module 810 may be a processor (or a processing circuit), for example, a baseband processor. The baseband processor may include one or more central processing units (central processing unit, CPU). When the first network device 800 is the component having the functions of the core network device, the transceiver module 820 may be a radio frequency unit, and the processing module 810 may be a processor (or a processing circuit), for example, a baseband processor. When the first network device 800 is a chip system, the transceiver module 820 may be an input/output interface of a chip (for example, a baseband chip), and the processing module 810 may be a processor (or a processing circuit) of the chip system, and may include one or more central processing units. It should be understood that the processing module 810 in this embodiment of this disclosure may be implemented by a processor or a processor-related circuit component (or a processing circuit), and the transceiver module 820 may be implemented by a transceiver or a transceiver-related circuit component.

For example, the processing module 810 may be configured to perform all operations performed by the first network device in the embodiment shown in FIG. 5 except sending and receiving operations, and/or configured to support another process of the technology described in this specification. The transceiver module 820 may be configured to perform all sending and receiving operations performed by the first network device in the embodiment shown in FIG. 5, for example, S501 and S502, and/or configured to support another process of the technology described in this specification.

In another example, the processing module 810 may be configured to perform all operations performed by the first network device in the embodiment shown in FIG. 6 except sending and receiving operations, and/or configured to support another process of the technology described in this specification. The transceiver module 820 may be configured to perform all sending and receiving operations performed by the first network device in the embodiment shown in FIG. 6, for example, S601, and/or configured to support another process of the technology described in this specification.

In still another example, the processing module 810 may be configured to perform all operations performed by the first network device in the embodiment shown in FIG. 7 except sending and receiving operations, and/or configured to support another process of the technology described in this specification. The transceiver module 820 may be configured to perform all sending and receiving operations performed by the first network device in the embodiment shown in FIG. 7, for example, S701 and S703, and/or configured to support another process of the technology described in this specification.

In addition, the transceiver module 820 may be a functional module. The functional module can implement both a sending operation and a receiving operation. For example, the transceiver module 820 may be configured to perform all sending operations and all receiving operations performed by the first network device in any one of the embodiments shown in FIG. 5 to FIG. 7. For example, when a sending operation is performed, it may be considered that the transceiver module 820 is a sending module, while when a receiving operation is performed, it may be considered that the transceiver module 820 is a receiving module. Alternatively, the transceiver module 820 may be two functional modules. The transceiver module 820 may be considered as a general term of the two functional modules. The two functional modules include a sending module and a receiving module. The sending module is configured to implement a sending operation. For example, the sending module may be configured to perform all sending operations performed by the first network device in any one of the embodiments shown in FIG. 5 to FIG. 7. The receiving module is configured to implement a receiving operation. For example, the receiving module may be configured to perform all receiving operations performed by the first network device in any one of the embodiments shown in FIG. 5 to FIG. 7.

The transceiver module 820 is configured to send first indication information to a first terminal device, where the first indication information indicates the first terminal device to send information about at least one HARQ process of the first terminal device to the first network device; and is further configured to receive the information about the at least one HARQ process from the first terminal apparatus, where the information about the at least one HARQ process includes a process number of a first HARQ process; and send first data to the first terminal device through the first HARQ process.

In an optional implementation, the at least one HARQ process is an occupied HARQ process of the first terminal device, an unoccupied HARQ process of the first terminal device, or all HARQ processes of the first terminal device.

In an optional implementation, the information about the at least one HARQ process further includes an NDI corresponding to the first HARQ process.

In an optional implementation, before the first network device sends the first indication information, a second network device is faulty, where the second network device is a network device that communicates with the first terminal device before the fault occurs.

Alternatively, the transceiver module 820 is configured to send second indication information to a first terminal device, where the second indication information indicates the first terminal device to clear a buffer of at least one HARQ process of the first terminal device.

In an optional implementation, the at least one HARQ process is an occupied HARQ process of the first terminal device, a HARQ process specified by the second indication information, or all HARQ processes of the first terminal device.

In an optional implementation, before the first terminal device receives the second indication information from a first network device, a second network device is faulty, where the second network device is a network device that communicates with the first terminal device before the fault occurs.

Alternatively, the transceiver module 820 is configured to send first downlink control information to a first terminal device, where the first downlink control information is for scheduling first data, and the first downlink control information further indicates that the first data is newly transmitted data; and is further configured to send the first data to the first terminal device.

In an optional implementation, the first downlink control information includes third indication information indicating that the first data is newly transmitted data, or a radio network temporary identifier RNTI using which the first downlink control information is scrambled indicates that the first data is newly transmitted data.

In an optional implementation, before the first network device sends the first downlink control information, a second network device is faulty, where the second network device is a network device that communicates with the first terminal device before the fault occurs.

For other functions that can be implemented by the first network device 800, refer to the related descriptions of any one of embodiments shown in FIG. 5 to FIG. 7. Details are not described again.

Figure 9:
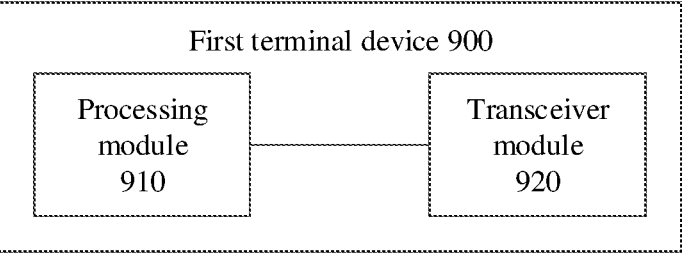
FIG. 9 is a schematic block diagram of a terminal apparatus according to an embodiment of this disclosure.

FIG. 9 is a schematic block diagram of a communication apparatus 900 according to an embodiment of this disclosure. For example, the communication apparatus 900 is a first terminal device 900. For example, the first terminal device 900 is, for example, the first terminal device in any one of the embodiments shown in FIG. 5 to FIG. 7.

The first terminal device 900 includes a processing module 910. Optionally, the first terminal device 900 may further include a transceiver module 920. For example, the first terminal device 900 may be an access network device, or may be a chip used in a terminal device or another combined device or component that has functions of the terminal device. When the first terminal device 900 is the terminal device, the transceiver module 920 may be a transceiver, where the transceiver may include an antenna, a radio frequency circuit, and the like. The processing module 910 may be a processor (or a processing circuit), for example, a baseband processor, where the baseband processor may include one or more CPUs. When the first terminal device 900 is the component having the functions of the terminal device, the transceiver module 920 may be a radio frequency unit, and the processing module 910 may be a processor (or a processing circuit), for example, a baseband processor. When the terminal device 900 is a chip system, the transceiver module 920 may be an input/output interface of a chip (for example, a baseband chip), and the processing module 910 may be a processor (or a processing circuit) of the chip system, and may include one or more central processing units. It should be understood that the processing module 910 in this embodiment of this disclosure may be implemented by a processor or a processor-related circuit component (or referred to as a processing circuit), and the transceiver module 920 may be implemented by a transceiver or a transceiver-related circuit component.

For example, the processing module 910 may be configured to perform all operations performed by the first terminal device in the embodiment shown in FIG. 5 except sending and receiving operations, and/or configured to support another process of the technology described in this specification. The transceiver module 920 may be configured to perform all sending and receiving operations performed by the first terminal device in the embodiment shown in FIG. 5, for example, S501, S502, and S503, and/or configured to support another process of the technology described in this specification.

In another example, the processing module 910 may be configured to perform all operations performed by the first terminal device in the embodiment shown in FIG. 6 except sending and receiving operations, for example, S602, and/or configured to support another process of the technology described in this specification. The transceiver module 920 may be configured to perform all sending and receiving operations performed by the first terminal device in the embodiment shown in FIG. 6, for example, S601, and/or configured to support another process of the technology described in this specification.

In still another example, the processing module 910 may be configured to perform all operations performed by the first terminal device in the embodiment shown in FIG. 7 except sending and receiving operations, for example, S702, and/or configured to support another process of the technology described in this specification. The transceiver module 920 may be configured to perform all sending and receiving operations performed by the first terminal device in the embodiment shown in FIG. 7, for example, S701 and S703, and/or configured to support another process of the technology described in this specification.

In addition, for an implementation of the transceiver module 920, refer to the descriptions of the implementation of the transceiver module 820.

The transceiver module 920 is configured to receive first indication information from a first network device.

The processing module 910 is configured to send information about at least one HARQ process of the first terminal device to the first network device based on the first indication information, where the information about the at least one HARQ process includes a process number of a first HARQ process.

The transceiver module 920 is further configured to receive first data from the first network device through the first HARQ process.

In an optional implementation, the at least one HARQ process is an occupied HARQ process of the first terminal device, an unoccupied HARQ process of the first terminal device, or all HARQ processes of the first terminal device.

In an optional implementation, the information about the at least one HARQ process further includes an NDI corresponding to the first HARQ process.

In an optional implementation, before the first terminal device receives the first indication information from the first network device, a second network device that communicates with the first terminal device is faulty.

Alternatively, the transceiver module 920 is configured to receive second indication information from a first network device.

The processing module 910 is configured to clear a buffer of at least one HARQ process of the first terminal device based on the second indication information.

In an optional implementation, the at least one HARQ process is an occupied HARQ process of the first terminal device, an unoccupied HARQ process of the first terminal device, or all HARQ processes of the first terminal device.

In an optional implementation, before the first terminal device receives the second indication information from the first network device, a second network device that communicates with the first terminal device is faulty.

For other functions that can be implemented by the first terminal device 900, refer to the related descriptions in the embodiments shown in FIG. 5 to FIG. 7. Details are not described again.

Figure 10:
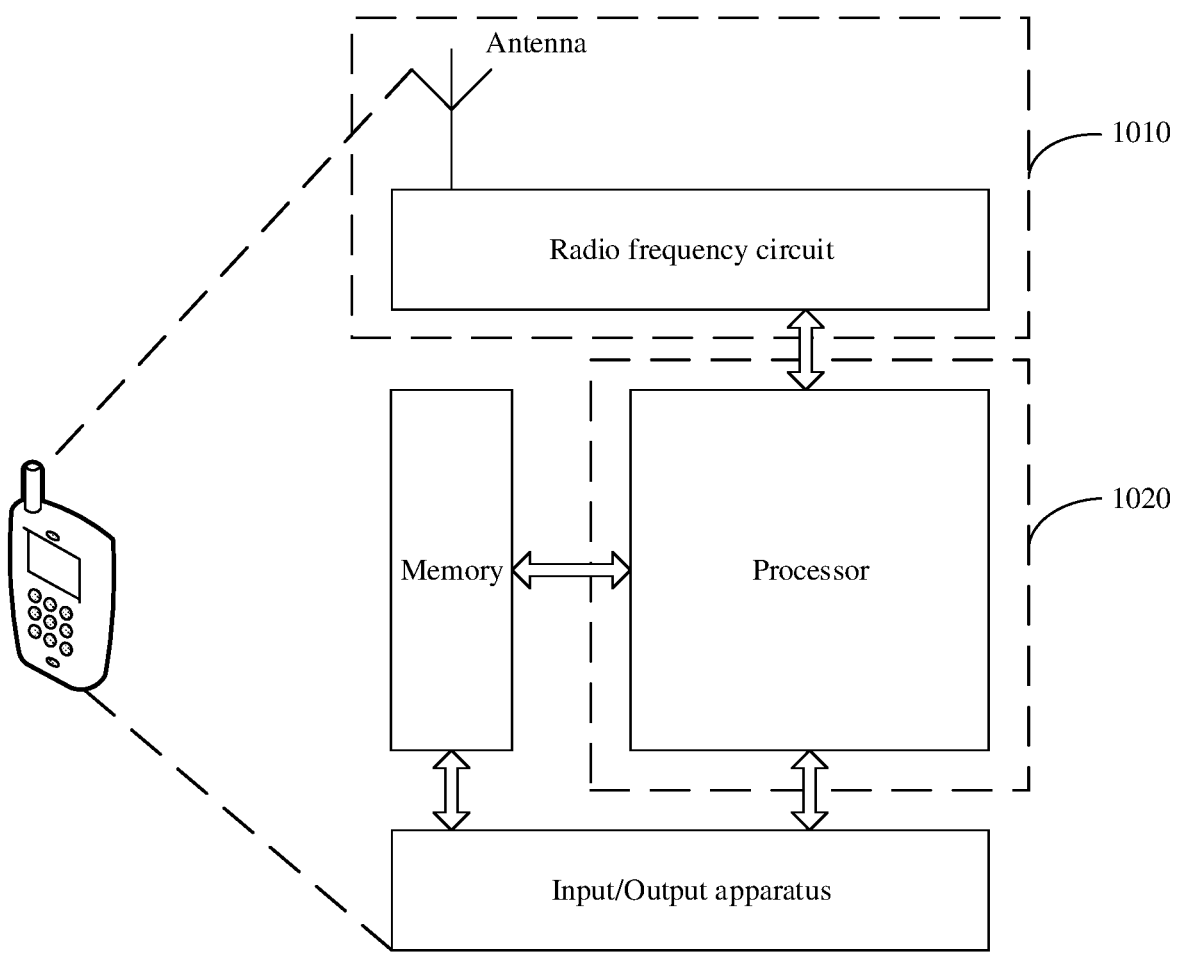
FIG. 10 is a schematic block diagram of a communication apparatus according to an embodiment of this disclosure.

When the communication apparatus is a terminal device, FIG. 10 is a simplified schematic diagram of a structure of a terminal device. For ease of understanding and convenience of figure illustration, an example in which the terminal device is a mobile phone is used in FIG. 10. As shown in FIG. 10, the terminal device includes a processor a memory, a radio frequency circuit, an antenna, and an input/output apparatus. The processor is mainly configured to process a communication protocol and communication data, control the terminal device, execute a software program, process data of the software program, and the like. The memory is configured to store the software program and the data. The radio frequency circuit is mainly configured to perform conversion between a baseband signal and a radio frequency signal and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user, and output data to the user. It should be noted that some types of terminal devices may have no input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in a form of an electromagnetic wave to the outside through the antenna. When data is sent to the terminal device, the radio frequency circuit receives the radio frequency signal through the antenna, converts the radio frequency signal into the baseband signal, and outputs the baseband signal to the processor. The processor converts the baseband signal into data and processes the data. For ease of description, FIG. 10 shows only one memory and one processor. An actual terminal device product may include one or more processors and one or more memories. The memory may also be referred to as a storage medium, a storage device, or the like. The memory may be deployed independent of the processor, or may be integrated with the processor. This is not limited in embodiments of this disclosure.

In this embodiment of this disclosure, the antenna and the radio frequency circuit that have receiving and sending functions may be considered as a transceiver unit of the terminal device (where the transceiver unit may be one functional unit, and the functional unit can implement a sending function and a receiving function; or the transceiver unit may include two functional units: a receiving unit that can implement a receiving function and a sending unit that can implement a sending function), and the processor that has a processing function may be considered as a processing unit of the terminal device. As shown in FIG. 10, the terminal device includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. That is, the transceiver unit 1010 includes the receiving unit and the sending unit. The transceiver unit may sometimes be referred to as a transceiver, a transceiver machine, a transceiver circuit, or the like. The receiving unit may also be sometimes referred to as a receiver, a receiver machine, a receiver circuit, or the like. The sending unit sometimes may also be referred to as a transmitter, a transmitter machine, a transmitter circuit, or the like.

It should be understood that, for the first terminal device in the embodiment shown in FIG. 5, the transceiver unit 1010 is configured to perform a sending operation and a receiving operation on the first terminal device side in the embodiment shown in FIG. 5, and the processing unit 1020 is configured to perform an operation other than the receiving and sending operations of the first terminal device in the embodiment shown in FIG. 5.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 11:
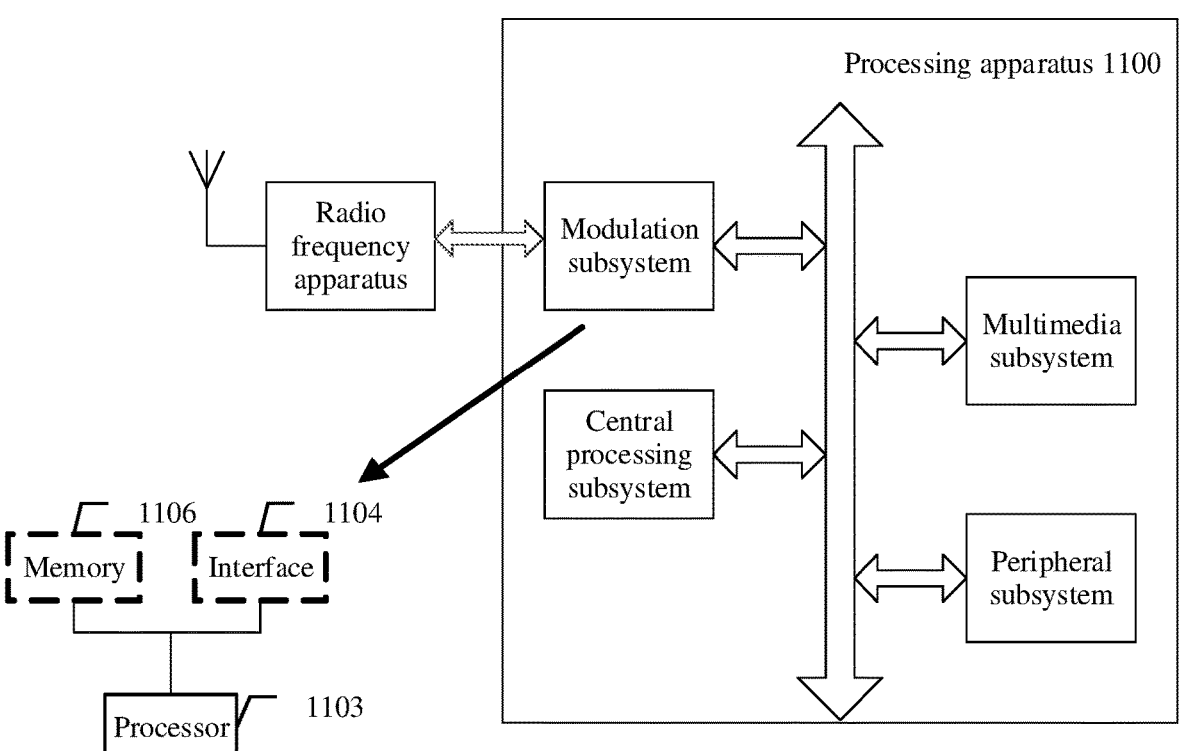
FIG. 11 is another schematic block diagram of a communication apparatus according to an embodiment of this disclosure.

FIG. 11 shows another form of this embodiment. A processing apparatus 1100 includes modules such as a modulation subsystem, a central processing subsystem, and a peripheral subsystem. The communication apparatus in this embodiment may be used as the modulation subsystem. Specifically, the modulation subsystem may include a processor 1103 and an interface 1104. The processor 1103 implements a function of the foregoing processing module 810, and the interface 1104 implements a function of the foregoing transceiver module 820. In another variation, the modulation subsystem includes a memory 1106, a processor 1103, and a program that is stored in the memory 1106 and that is executable on the processor. When executing the program, the processor 1103 implements the method on the terminal device side in the foregoing method embodiments. It should be noted that the memory 1106 may be nonvolatile or may be volatile, and may be located inside the modulation subsystem or in the processing apparatus 1100, provided that the memory 1106 can be connected to the processor 1103.

Figure 12:
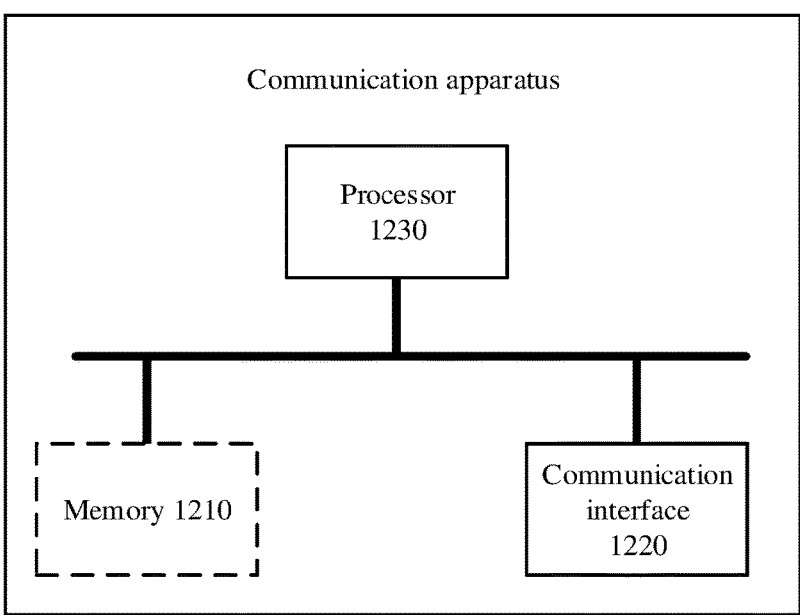
FIG. 12 is still another schematic block diagram of a communication apparatus according to an embodiment of this disclosure.

FIG. 12 is a schematic diagram of still another communication apparatus according to an embodiment of this disclosure. The communication apparatus is configured to implement operations of the first terminal device, the first network device, or the second network device in the foregoing embodiments. The communication apparatus includes a processor 1210 and an interface 1230. Optionally, the communication apparatus further includes a memory 1220. The interface 1230 is configured to implement communication with another device.

The method performed by the first terminal device, the first network device, or the second network device in the foregoing embodiments may be implemented by the processor 1210 by invoking a program stored in a memory (which may be the memory 1220 in the first terminal device, the first network device, or the second network device, or may be an external memory). In other words, the apparatus used for the first terminal device, the first network device, or the second network device may include the processor 1210. The processor 1210 invokes the program in the memory to perform the method performed by the first terminal device, the first network device, or the second network device in the foregoing method embodiments. The processor herein may be an integrated circuit having a signal processing capability, for example, a CPU. The apparatus used for the first terminal device, the first network device, or the second network device may be implemented by configuring one or more integrated circuits for implementing the foregoing methods, for example, one or more ASICs, one or more microprocessors DSPs, one or more FPGAs, or a combination of at least two of the integrated circuit forms. Alternatively, the foregoing implementations may be combined.

For example, functions/implementation processes of the processing module 810 in FIG. 8 may be implemented by the processor 1210 in the communication apparatus 1200 shown in FIG. 12 by invoking computer-executable instructions stored in the memory 1220. Functions/implementation processes of the transceiver module 820 in FIG. 8 may be implemented through the communication interface 1230 in the communication apparatus 1200 shown in FIG. 12.

In another example, functions/implementation processes of the processing module 910 in FIG. 9 may be implemented by the processor 1210 in the communication apparatus 1200 shown in FIG. 12 by invoking computer-executable instructions stored in the memory 1220. Functions/implementation processes of the transceiver module 920 in FIG. 9 may be implemented through the communication interface 1230 in the communication apparatus 1200 shown in FIG. 12.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits in embodiments of this disclosure may implement or operate the functions via a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this disclosure may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may alternatively be integrated into the processor. The processor and the storage medium may be deployed in the ASIC.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing specific functions in one or more processes in the flowcharts and/or in one or more blocks in the block diagrams.

In one or more design examples, the functions described in embodiments of this disclosure may be implemented by using hardware, software, firmware, or any combination thereof. If the functions are implemented by using software, these functions may be stored in a computer-readable medium or are transmitted to the computer-readable medium in a form of one or more instructions or code. The computer-readable medium is either a computer storage medium or a communication medium that enables a computer program to move from one place to another. The storage medium may be an available medium that may be accessed by any general-purpose or dedicated computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD), a floppy disk, and a Blu-ray disc. The disc usually copies data in a magnetic manner, and the disk usually copies data optically in a laser manner. The foregoing combination may also be included in the computer-readable medium.

A person skilled in the art should be aware that in the foregoing one or more examples, functions described in embodiments of this disclosure may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing specific implementations, the objectives, technical solutions, and beneficial effects of embodiments of this disclosure are further described in detail. It should be understood that the foregoing descriptions are merely specific implementations of embodiments of this disclosure, but are not intended to limit the protection scope of embodiments of this disclosure. Any modification, equivalent replacement, or improvement made based on the technical solutions of embodiments of this disclosure shall fall within the protection scope of embodiments of this disclosure. The foregoing descriptions in this specification of this disclosure may enable technologies in the art to use or implement the content of embodiments of this disclosure. Any modification based on the disclosed content should be considered definite in the art. The basic principles described in embodiments of this disclosure may be applied to other variations without departing from the essence and scope of this disclosure. Therefore, the content disclosed in embodiments of this disclosure is not limited to the described embodiments and designs, but may also be extended to a maximum scope consistent with the principles and disclosed new features of this disclosure.

Although this disclosure is described with reference to specific features and embodiments thereof, it is clear that various modifications and combinations may be made to this disclosure without departing from the spirit and scope of embodiments of this disclosure. Correspondingly, the specification and accompanying drawings are only example descriptions of this disclosure defined by the appended claims, and are considered as any of or all modifications, variations, combinations or equivalents that cover the scope of this disclosure. It is clear that a person skilled in the art can make various modifications and variations to this disclosure without departing from the scope of this disclosure. In this way, embodiments of this disclosure are intended to cover these modifications and variations provided that they fall within the scope of protection defined by the following claims of this disclosure and their equivalent technologies.

What is claimed is:

1. An indication information receiving method comprising:

receiving, by a first terminal device, first indication information from a first network device after a failure of communication between the first terminal device and a second network device occurred;

sending, by the first terminal device, information about at least one hybrid automatic repeat request (HARQ) process of the first terminal device to the first network device based on the first indication information, wherein the at least one HARQ process is an occupied HARQ process of the first terminal device, and the information about the at least one HARQ process comprises a process number of a first HARQ process; and receiving, by the first terminal device, first data from the first network device through a second HARQ process, wherein the second HARQ process is an unoccupied HARQ process of the first terminal device.

2. The method according to claim 1, wherein
the information about the at least one HARQ process further comprises a new data indicator (NDI) corresponding to the first HARQ process.

3. The method according to claim 1, further comprising:
receiving, by the first terminal device, second indication information: from the first network device; and
clearing, by the first terminal device, a buffer of the at least one HARQ process of the first terminal device based on the second indication information.

4. The method according to claim 1, wherein the communication between the first terminal device and the second network device before the failure occurs includes communication of a new data indicator (NDI) which indicates a new data transmission.

5. An indication information sending method comprising:
sending, by a first network device, first indication information to a first terminal device after a failure of communication between the first terminal device and a second network device occurred, wherein the first indication information indicates the first terminal device to send information about at least one hybrid automatic repeat request (HARQ) process of the first terminal device to the first network device;

receiving, by the first network device, the information about the at least one HARQ process from the first terminal device, wherein the at least one HARQ process is an occupied HARQ process of the first terminal device, and the information about the at least one HARQ process comprises a process number of a first HARQ process; and sending, by the first network device, first data to the first terminal device through a second HARQ process, wherein the second HARQ process is an unoccupied HARQ process of the first terminal device.

6. The method according to claim 1, wherein:
before the first terminal device receives the first indication information from the first network device, a second network device that communicates with the first terminal device is faulty; and
the first terminal device communicates with the second network device before the fault by the second network device occurs; and
the information about the at least one HARQ process has been exchanged between the first network device and the second network device in real time before the fault by the second network device occurs.

7. The method according to claim 1, wherein the information about the at least one HARQ process further comprises information that a HARQ buffer corresponding to the at least one HARQ process is occupied.

8. The method according to claim 5, wherein
the information about the at least one HARQ process further comprises a new data indicator (NDI) corresponding to the first HARQ process.

9. A communication apparatus comprising:
one or more processors; and
a non-transitory computer-readable storage medium storing a program including instructions to be executed by the one or more processors such that the communication apparatus is configured at least to:

receive first indication information from a first network device after a failure of communication between the communication apparatus and a second network device occurred; and send information about at least one hybrid automatic repeat request (HARQ) process of the communication apparatus to the first network device based on the first indication information, wherein the at least one HARQ process is an occupied HARQ process of the communication apparatus, and the information about the at least one HARQ process comprises a process number of a first HARQ process, and receive first data from the first network device through a second HARQ process, wherein the second HARQ process is an unoccupied HARQ process of the communication apparatus.

10. The method according to claim 5, wherein the communication between the first terminal device and the second network device before the failure occurs includes communication of includes communication of a new data indicator (NDI) which indicates a new data transmission.

11. The method according to claim 5, wherein:
before the first network device sends the first indication information, a second network device is faulty, and wherein the second network device is a network device that is configured to communicate with the first terminal device before the fault by the second network device occurs; and
the first network device exchanges the information about the at least one HARQ process with the second network device in real time before the fault by the second network device occurs.

12. The method according to claim 5, wherein the information about the at least one HARQ process further comprises information that a HARQ buffer corresponding to the at least one HARQ process is occupied.

13. A communication apparatus comprising:
one or more processors; and
a non-transitory computer-readable storage medium storing a program including instructions to be executed by the one or more processors such that the communication apparatus is configured at least to:

send first indication information to a first terminal device after a failure of communication between the first terminal device and a network device occurred, wherein the first indication information indicates the first terminal device to send information about at least one hybrid automatic repeat request (HARQ) process of the first terminal device to the communication apparatus; and

receive the information about the at least one HARQ process from the first terminal device, wherein the at least one HARQ process is an occupied HARQ process of the first terminal device, and the information about the at least one HARQ process comprises a process number of a first HARQ process; and send first data to the first terminal device through a second HARQ process, wherein the second HARQ process is an unoccupied HARQ process of the first terminal device.

14. The communication apparatus according to claim 9, wherein the information about the at least one HARQ process further comprises a new data indicator (NDI) corresponding to the first HARQ process.

15. The communication apparatus according to claim 9, wherein the communication apparatus is further configured to:

receive second indication information from the first network device; and clear a buffer of the at least one HARQ process of the communication apparatus based on the second indication information.

16. The communication apparatus according to claim 9, wherein:

before receipt of the first indication information from the first network device, a second network device that is configured to communicate with the communication apparatus that the second network device is faulty; and

the communication apparatus is configured to communicate with the second network device before the fault by the second network device occurs; and the information about the at least one HARQ process has been exchanged between the first network device and the second network device in real time before the fault by the second network device occurs.

17. The communication apparatus according to claim 9, wherein the information about the at least one HARQ process further comprises information that a HARQ buffer corresponding to the at least one HARQ process is occupied.

18. The communication apparatus according to claim 13, wherein the information about the at least one HARQ process further comprises a new data indicator (NDI) corresponding to the first HARQ process.

19. The communication apparatus according to claim 13, wherein:

before the first indication information is sent, a network device is faulty, wherein the network device is configured to communicate with the first terminal device before the fault by the network device occurs; and the communication apparatus is further configured exchange the information about the at least one HARQ process with the network device in real time before the fault by the network device occurs.

20. The communication apparatus according to claim 13, wherein the information about the at least one HARQ process further comprises information that a HARQ buffer corresponding to the at least one HARQ process is occupied.

* * * * *